(12) United States Patent
Bull

(10) Patent No.: US 11,410,246 B2
(45) Date of Patent: Aug. 9, 2022

(54) SYSTEM AND METHOD FOR CONSOLIDATION, RECONCILIATION AND PAYMENT MANAGEMENT

(71) Applicant: Salus Finance, LLC, Old Greenwich, CT (US)

(72) Inventor: Robert Alan Bull, Old Greenwich, CT (US)

(73) Assignee: Salus Finance, LLC, Old Greenwich, CT (US)

( * ) Notice: Subject to any disclaimer, the term of this patent is extended or adjusted under 35 U.S.C. 154(b) by 0 days.

(21) Appl. No.: 16/893,076

(22) Filed: Jun. 4, 2020

(65) Prior Publication Data
US 2020/0387976 A1 Dec. 10, 2020

Related U.S. Application Data

(60) Provisional application No. 62/858,096, filed on Jun. 6, 2019.

(51) Int. Cl.
*G06Q 40/08* (2012.01)
*G06Q 30/00* (2012.01)
(Continued)

(52) U.S. Cl.
CPC ........... *G06Q 40/08* (2013.01); *G06N 3/0427* (2013.01); *G06N 3/08* (2013.01); *G06Q 10/10* (2013.01);
(Continued)

(58) Field of Classification Search
CPC ........ G06Q 40/08; G06Q 40/12; G06Q 10/10; G06Q 20/085; G06Q 20/14; G06Q 20/405;
(Continued)

(56) References Cited

U.S. PATENT DOCUMENTS 6,826,542 B1 * 11/2004 Virgin .................... G06Q 40/08
705/40
7,587,363 B2 * 9/2009 Cataline ................. G06Q 20/00
705/35
(Continued)

OTHER PUBLICATIONS

Olfunke et al., "On consolidation in e-bill presentment and payment", Information & Management & Computer Security 17.3: 234-247, Emerald Group Publishing Limited (Year: 2009).*
(Continued)

*Primary Examiner* — Frantzy Poinvil
(74) *Attorney, Agent, or Firm* — Whitmyer IP Group

(57) ABSTRACT

A system for consolidating and reconciling invoices includes: an input port receiving benefits information related to insurance benefits recipients and invoices from one or more benefits vendors; a rules engine enforcing rules on the benefits information, the rules engine being configured to monitor the benefits information for determining exceptions based on the rules; a processing unit including a consolidation module and reconciliation module; the reconciliation module analyzing and comparing each invoice against the benefits information to detect inaccuracies in each invoice, the inaccuracies being designated as exceptions; and the consolidation module merging the invoices into a single bill. During merging, the processing unit calculates an adjusted invoice amount for the invoice which has the exception and incorporates the adjusted invoice amount into the single bill. An output port transmits the single bill to a client device for making a single deposit of funds to settle the invoices.

18 Claims, 6 Drawing Sheets

(51) Int. Cl.
*G06Q 30/04* (2012.01)
*G06Q 40/00* (2012.01)
*G06Q 10/10* (2012.01)
*G06N 3/08* (2006.01)
*G06Q 40/02* (2012.01)
*G06Q 20/14* (2012.01)
*G06Q 20/40* (2012.01)
*G06Q 50/26* (2012.01)
*G06N 3/04* (2006.01)
*G06Q 20/08* (2012.01)

(52) U.S. Cl.
CPC ........... *G06Q 20/085* (2013.01); *G06Q 20/14* (2013.01); *G06Q 20/405* (2013.01); *G06Q 30/0185* (2013.01); *G06Q 30/04* (2013.01); *G06Q 40/02* (2013.01); *G06Q 40/12* (2013.12); *G06Q 50/26* (2013.01)

(58) Field of Classification Search
CPC .... G06Q 30/0185; G06Q 30/04; G06Q 40/02; G06Q 50/26; G06N 3/0427
USPC ....................................................... 705/3–44
See application file for complete search history.

(56) References Cited

U.S. PATENT DOCUMENTS

| | | | | |
|---|---|---|---|---|
| 7,756,784 B2 * | 7/2010 | Provinse | ................ | G06Q 10/02 705/39 |
| 7,822,679 B1 * | 10/2010 | Vaux | .................... | G06Q 40/025 705/38 |
| 8,236,754 B2 * | 8/2012 | Fogelman | .............. | A61K 38/16 514/1.9 |
| 8,396,811 B1 * | 3/2013 | Hahn-Carlson | ........ | G06Q 30/02 705/72 |
| 8,498,935 B2 * | 7/2013 | Leavitt | ................... | G06Q 20/12 705/40 |
| 8,615,403 B2 * | 12/2013 | Lipsky | ................... | G06Q 30/04 705/2 |
| 8,799,025 B2 * | 8/2014 | Ruszala | ................ | G06Q 30/04 705/4 |
| 2002/0143674 A1 * | 10/2002 | Beckman | ............... | G06Q 30/04 705/34 |
| 2003/0233321 A1 * | 12/2003 | Scolini | .................. | H04M 15/55 705/40 |
| 2008/0243654 A1 * | 10/2008 | Wernze | .............. | G06Q 10/0875 705/34 |
| 2009/0112747 A1 * | 4/2009 | Mullen | ................... | G06Q 20/04 705/35 |
| 2010/0030675 A1 * | 2/2010 | Hanan | .................... | G06Q 30/04 705/34 |
| 2010/0153247 A1 * | 6/2010 | DiPaolo | ................ | G06Q 40/00 705/34 |
| 2012/0197788 A1 * | 8/2012 | Sanghvi | ................ | G06Q 30/02 705/40 |
| 2013/0275279 A1 | 10/2013 | Raymond et al. | | |
| 2014/0289154 A1 * | 9/2014 | Cooper | ................ | G06Q 10/103 705/322 |
| 2015/0012422 A1 * | 1/2015 | Ceribelli | ............ | G06Q 20/0425 705/40 |
| 2015/0012442 A1 * | 1/2015 | Ceribelli | ............ | G06Q 20/0425 705/45 |
| 2015/0310406 A1 * | 10/2015 | Anderson | .............. | G06Q 30/04 705/40 |
| 2017/0032432 A1 * | 2/2017 | Kaufmann | ............. | G06Q 30/04 |
| 2017/0236218 A1 * | 8/2017 | Shak | ...................... | G06Q 40/12 705/30 |
| 2018/0144314 A1 * | 5/2018 | Miller | .................. | G06Q 20/405 |

OTHER PUBLICATIONS

International Search Report and Written Opinion of the International Seraching Authority; Application No. PCT/US2020/36323; Completed: Jul. 29, 2020; dated Aug. 26, 2020; 8 Pages.

* cited by examiner

SYSTEM AND METHOD FOR CONSOLIDATION, RECONCILIATION AND PAYMENT MANAGEMENT

TECHNICAL FIELD

The present teachings relate to a system and method for the administration and processing of records and payment of monies owed. More specifically, the present teachings relate to a system and method that manages, processes, consolidates, audits, reconciles, and transacts payments for fixed and variable expenses, and further provides record consolidation, comprehensive reconciliation, data analytics, and payment facilitation. The present teachings may specifically apply to insurance fields, including health and voluntary benefits.

BACKGROUND

The management of insurance and/or benefits information and related payments can be an arduous and time-consuming task. Inefficient management of insurance information, coverage levels, billing, and payment can be costly to insurance companies, brokers, carriers, third party administrators, captives, associations, employers, employees, and patients/insured alike. Insured groups have many different vendors that, over extended periods of time, need to remain current and updated with enrollment information, such as coverage and pricing information. Furthermore, the management of insurance and/or benefits information requires control over and access to sensitive personal and health information that must be protected against threats of hacking, unauthorized access and/or manipulation, and/or other wrongdoing.

Current practices often rely on a one or more person(s) manually entering enrollment information, pricing data, and plan data into a spreadsheet, checking whether such information is accurate, and issuing multiple bills to the insured or employer of the insured. However, current practices frequently result in inaccurate billing, such as overbilling for benefits, or omission of coverage and such practices are not able to efficiently and accurately account for circumstances like changes in coverage, enrollment periods, contractual specifics, or enrollment eligibility. These difficulties are exacerbated when viewed across many jurisdictions and territories, from township and county levels to a country-by-country basis. Multiple payments to numerous vendors are burdensome and difficult to manage. Moreover, data security is difficult to manage effectively.

Accordingly, there exists a need in the art for a system which automates and simplifies record consolidation, reconciliation and payment management.

SUMMARY

The needs set forth herein as well as further and other needs and advantages are addressed by the present embodiments, which illustrate solutions and advantages described below.

It is an object of the present teachings to remedy the above drawbacks and shortcomings associated with historical practices and methods of administering and reconciling records and processing related payments.

It is an object of the present teachings to prevent inaccurate invoicing and corresponding payments and ensure clients (e.g., employers, insured) are paying the correct amount of money pursuant to demand for payment.

It is an object of the present teachings to prevent inaccurate invoicing and corresponding payments and ensure clients (e.g., employers, insured) are paying the correct amount of money pursuant to statements demanding monetary payments, including invoices for their health and voluntary benefits each billing cycle.

It is an object of the present teachings to provide a system with centralized billing and reconciliation functions that minimize errors and reduce time in administering and processing records and health benefits and identifying and correcting billing and/or payment errors.

It is an object of the present teachings to standardize and consolidate records from numerous distinct vendors with potentially variable billing practices and billing structures to provide a single, accurate consolidated and reconciled statement that may be paid with a single payment each billing cycle (as applicable).

It is an object of the present teachings to provide, in an insurance context, a single statement that has been consolidated and fully reconciled with, for example, enrollee coverage for which the enrollee is eligible, applicable rules and regulations, including legal regulations, contractual requirements, and financial data, such as premium costs and past billing practices.

It is an object of the present teachings to provide accuracy in billing through application of effective dates, including benefits-enrollment effective dates, to system data elements such as persons, dependents, coverage levels, and the like.

It is an object of the present teachings to minimize time for onboarding new clients of health and voluntary benefits to maximize coverage for insureds.

It is an object of the present teachings to manage enrollee data in compliance with the highest security protocols and standards in the health industry, including through methods such as data segregation.

It is an object of the present teachings to provide a system that is agnostic as to integrative compatibility in that the system may be integrated with numerous third-party systems, such as accounting, human resource information, benefit administration, and enrollment systems.

It is an object of the present teachings to provide a system that is technologically agnostic in that it may utilize numerous data feed types, including but not limited to different file formats, and numerous data transmission technologies and methodologies.

It is an object of the present teachings to utilize natural language processing and trained neural networks in reconciling records to quickly and efficiently identify billing issues during processing.

It is an object of the present teachings to allow for processing of payments for insurance.

It is an object of the present teachings to allow for a single payment, paid by a client, to be separated into multiple payments to distinct recipients, including while in transit in an external banking system, and be accurately and timely delivered to distinct recipients.

It is an object of the present teachings to allow for payments from distinct clients to be combined into a single payment to a single recipient, including while in transit in the federal banking system, and be accurately and timely delivered to the relevant recipient(s) as a single payment to each.

It is an object of the present teachings to allow for payments from distinct departments within a single client to be combined, including while in transit in the federal banking system, to be accurately and timely delivered to the relevant recipient(s) as a single payment to each.

It is an object of the present teachings to allow for payments from distinct collections of financial resources within a single client (e.g., money from specific accounts) to be combined, including while in transit in the federal banking system to be accurately and timely delivered to the relevant recipient(s) as a single payment to each.

It is an object of the present teachings to allow for any of the payment processes above to be combined or split in any way.

It is an object of the present teachings to automate chargebacks and minimize accounting within corporate organizational relationships, such as parent and subsidiary relationships, or within associations and captives.

These and other objects of the present teachings are achieved by providing a record consolidation, reconciliation, and payment system having one or more of the following: a rules engine, a processing unit further comprising a consolidation module and a reconciliation module, an administration module, a vendor reporting module, a dependent eligibility module, a data analytics module, a payment processing module, a background module, and a customer management relations (CRM)/Commissions module. The foregoing may be implemented on a computer, which may be for example a processor, remote computer, computer server, network, or any other typical computing resource. The foregoing may be implemented on one or more computers. The system 10 may be implemented as a cloud computing application or as a software as a service application.

The system for consolidating and reconciling invoices disclosed herein may comprise an input port receiving benefits information related to insurance benefits recipients; a rules engine having a plurality of rules and enforcing said rules on the benefits information, said rules engine being configured to monitor the benefits information for determining exceptions based on the rules; said input port receiving a plurality of invoices from one or more benefits vendors provided to said recipients; a processing unit including a consolidation module and a reconciliation module; said reconciliation module analyzing and comparing each invoice against said benefits information to detect inaccuracies in each invoice, said inaccuracies being designated as exceptions; said consolidation module tracking said invoices and being configured to merge said invoices into a single bill, wherein during merging, said processing unit calculates an adjusted invoice amount for the invoice which has the exception and incorporates the adjusted invoice amount into the single bill; and an output port that transmits the single bill to a client device configured to make a single deposit of funds for settling said invoices from said one or more benefits vendors.

The system for consolidating and reconciling data disclosed herein may comprise an input port receiving a feed of data, said data comprising a plurality of statements generated by one or more sources external to said system, each statement having a plurality of data elements; a rules engine having a plurality of rules and enforcing said rules on said data, said rules engine being configured to monitor said data and apply said rules thereto for determining exceptions; a processing unit including a consolidation module and a reconciliation module; said reconciliation module analyzing and comparing each data element of said respective statement against other data in said system to detect inequalities in each statement, said inequalities being designated as exceptions; said consolidation module tracking said statements and being configured to merge said statements into a single consolidated statement, wherein during merging, said processing unit calculates an adjusted statement amount for the statement which has the exception and incorporates the adjusted statement amount into the single statement; and said processing unit being configured to transmit the consolidated statement to one or more client devices via an output port; and a payment processing module that facilitates disbursement of money from a single deposit of funds made via said client device to recipients which provided the plurality of statements.

The system for consolidating and reconciling invoices disclosed herein may comprise an input port receiving benefits information related to insurance benefits recipients; a rules engine having a plurality of rules and enforcing said rules on the benefits information, said rules engine being configured to monitor the benefits information for determining exceptions based on the rules; said input port receiving a plurality of invoices from one or more benefits vendors provided to said recipients; a processing unit including a consolidation module and a reconciliation module; said consolidation module standardizing said plurality of invoices and merging said invoices into a single statement; said reconciliation module analyzing and comparing said single statement against said benefits information to detect inequalities, said inequalities being designated as exceptions, said reconciliation module generating a reconciled single statement comprising data elements from said plurality of invoices that do not result in exceptions; and an output port that transmits the reconciled single statement to a client device configured to make a single deposit of funds for settling said invoices from said one or more benefits vendors.

Other features and aspects of the present teachings will become apparent from the following detailed description, taken in conjunction with the accompanying drawings, which illustrate by way of example the features in accordance with embodiments of the present teachings. The summary is not intended to limit the scope of the present teachings.

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant that it does not intend any of the appended claims or claim elements to invoke 35 U.S.C. 112(f) unless the words "means for" or "step for" are explicitly used in the particular claim.

Figure 1:
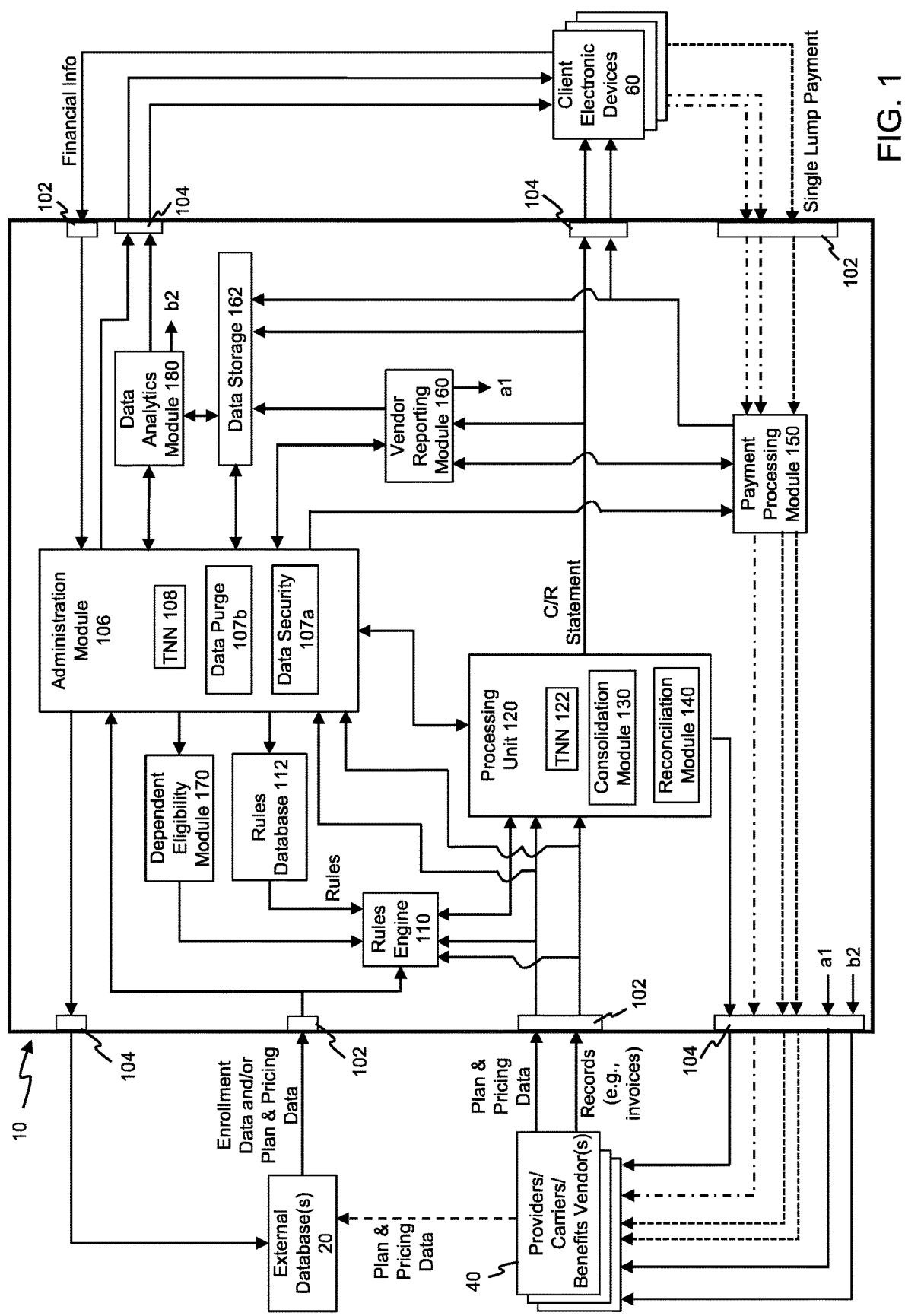
FIG. 1 is an illustrative block diagram of a consolidation and reconciliation system according to the present teachings.

Referring to FIG. 1, a consolidation and reconciliation system 10 according to the present teachings is shown.

The system 10 comprises a computer. The computer may for example be a processor, remote computer, computer server, network, or any other typical computing resource. The system 10 may comprise one or more computers.

The system 10 is configured to consolidate and reconcile data from any source and in the context of any industry. The system 10 is configured to work with all benefits and insurance types, including COBRA, and including all non-health insurance types.

The system 10 has one or more input ports 102 for receiving information and data from one or more external sources, such as a client, insurance carrier, or enrollment provider, via any suitable mechanism.

In some embodiments, the input port 102 may be configured to provide automated transmission methods. A pull method transmission may be accomplished through an HTTPS call that is initiated by the system 10 directly to a source external to the system 10 and pulls the data feed from the source external to the system 10 into the system 10. A push method transmission may be accomplished through a source external to the system 10 pushing a data feed in an agreed upon format to a secure facility, such as an FTP repository, specifically associated with the source external to the system 10. The system 10 may use one or more APIs to retrieve data. The system 10 is designed to accept and receive data feeds and map data in any suitable format, including JSON (JavaScript Object Notation) standard, all EDI formats, including ANSI 834 EDI and ANSI 837 EDI, XML format, and flat file format.

The system 10 may be in communication with third-party platforms, including third-party platforms in relation to services such as accounting, payroll, human resources, payment processing, benefits provision, and financial services. Such third-party platforms may send feeds of data to the system 10 that are received by the system 10 and that may be consolidated and reconciled in the system 10.

The system 10 may be in communication with one or more external database(s) 20, which may provide one or more feeds of data, including benefit enrollment data and/or benefit plan and/or pricing data, to the system 10. The data may be mapped to create one or more data sets or groups having a unique identifier, such as a client group and/or subgroup as needed, within the system 10.

An exemplary listing of enrollment data in the context of health insurance benefits that may be received by the system 10 from the external database(s) 20 is shown below:

| Ref # | Category/Data Field | Description |
|---|---|---|
| 1. | Enrollment group | |
| 1.1. | Name/ID | This field is the Group ID for the policy and will be used to identity the Enrollment Group. Generally, this is the name of the Company. |
| 2. | Benefit plan | |
| 2.1. | Name | Name of the Benefit Plan. |
| 2.2. | Type | Type of the Benefit Plan. |
| 2.3. | Enrollment group | Name of the Enrollment Group. |
| 3. | Coverage level | |
| 3.1. | Name | Name of the Coverage Level |
| 3.2. | Code | Code associated with the Coverage Level |
| 3.3. | Benefit plan | Benefit plan name. |
| 4. | Coverage | |
| 4.1. | Enrollee - Name of individual enrollee | Name of the individual Enrollee |
| 4.2. | Coverage level | Coverage Level for the Enrollee. |
| 4.3. | Effective to | Effective To-Date. |
| 4.4. | Effective from | Effective From-Date. |
| 4. | Enrollee | |
| 4.1. | Primary Insured | Indicator that this Enrollee is the Primary Insured, typically 'Y' or 'N' |
| 4.2. | Name | Name of the Insured. |
| 4.3. | ID Code | Insured identifier. Typically, this is a social security #. |
| 4.4. | Subscriber number | The Subscriber number for the policy |
| 4.5. | Birthday | Birthdate of the Insured |
| 4.6. | Gender | Gender of the Insured. |
| 4.7. | Primary enrollee (If not the Primary Insured | This is only required if this is NOT the Primary Insured (i.e. Primary Insured = "N") |

| Ref # | Category/Data Field | Description |
|---|---|---|
| 4.8. | Relationship (To primary enrollee) | This is the Relationship to the Primary Enrollee. |
| 4.9. | Marital status | Marital status indicator - Married, Single, Divorced, Legally Separated, Unreported |
| 4.10 | Employment status | Employment status value - Full time, Part time |
| 4.11 | Benefit status | Benefit status value - Active, COBRA, Surviving Spouse |

In addition to enrollment data, the system 10 may receive other data, including benefit plan data and/or pricing data, concerning one or more external sources, including one or more insurance providers, insurance carriers, and/or benefits vendors, and/or other third-parties (e.g., brokers) (collectively referred to as "benefits vendors") 40 that seek to receive one or more payments via the system 10. The system 10 may also receive data from any entity that seeks to reconcile data via the system 10. The system 10 may also receive data concerning insureds, including those insureds whose benefits information is received by the system 10 and that seek to pay for insurance benefits (collectively referred to as "insurance benefits recipients"). The system 10 may receive enrollment data and plan and pricing data from a single source, such as an external database 20, or from multiple sources. For instance, the system 10 may receive plan and pricing data from one or more benefits vendors 40, and enrollment data from a distinct external database 20.

The system 10 has one or more output ports 104 for sending information and data to one or more external sources, such as benefits vendors 40, users, clients, and/or insurance benefits recipients. The system 10, including without limitation the processing unit 120 and the payment processing module 150, may send data feeds to recipients external to the system 10 in any suitable format, including JSON (JavaScript Object Notation) standard, all EDI formats, including ANSI 834 EDI and ANSI 837 EDI, XML format, and flat file format.

All data that may be received by the system 10 may be benefits information, including one or more of enrollment data, plan data, vendor data, pricing data, group data, employee data, voluntary benefits data, dependent information data, invoice data, or financial data, including banking and credit card data. All data received by the system 10 may be tagged.

For example, all data may be tagged with a timestamp when the data is received by the system 10. This timestamp may be maintained wherever the data is located, utilized, and/or stored (production, back-ups, all spares, disaster recovery) within and by the system 10. Additional tags may be added to data including, for example, an effective date. By way of further example, all data may be tagged and/or classified based on security level, such as personal identifying information (PII), protected health information (PHI) or financial account numbers. Other examples of data tagging include tags for specific enrollees, contractual requirements, or country-specific requirements.

Data may be tagged to, for example, assign data a unique identifier for tracking data within the system 10 or tracking exportation of data outside the system 10. Data may also be tagged, by way of further example, to associate data with certain information utilized by the system 10, including enrollment information, rules information, security information, purging information, or financial information, as further described below.

Data may be tagged to, for example, identify dependents or dependents that are excepted from dependent eligibility rules after a dependent is no longer legally eligible for dependent status for health insurance benefits. For instance, following the system's 10 receipt of benefits enrollment information, the benefits enrollment information is processed by the system 10, including without limitation the administration module 106 or the rules engine 110, to detect dependents. Each dependent is then automatically checked and monitored for eligibility by the system 10, including without limitation the administration module 106, the rules engine 110, or a dependent eligibility module 170, when the new dependent appears in the enrollment feed, thereby ensuring that the insured remains in compliance with insurance regulations and is not paying costs and/or premiums for ineligible dependents.

The system 10 may apply an effective date to data received by the system 10. For instance, pricing data may receive an applied effective date based on contractual price agreements effective as of a certain date. The system 10 may consider the effective dates of data in administering, consolidating, and reconciling statements, such as healthcare and insurance billing and benefits statements.

Data, including data elements, may be tagged in any combination of ways described above. For instance, a data's tagging may comprise a timestamp of when a respective data element was imported into the system, a timestamp of when the respective data element is accessed or modified, and a username of a person who accessed or modified the respective data element.

The system 10 may comprise one or more modules. Each of the modules in the system 10 may be in communication with each of the other modules in the system 10.

The system 10 may comprise one or more of an administration module 106, a rules engine 110, a rules database 112, a processing unit 120, a consolidation module 130, a reconciliation module 140, a payment processing module 150, a vendor reporting module 160, a dependent eligibility module 170, and/or a data analytics module 180.

The system 10, may directly communicate with benefits vendors 40, users of the system 10, clients, and/or insurance benefits recipients with respect to benefits information, including without limitation by way of the administration module 106, the processing unit 120, and payment processing module 150.

With respect to the administration module 106, the administration module 106 may be configured to be in communication with each of the other modules in the system 10.

The administration module 106 may register users. The administration module 106 may register users by, for example, cataloguing users and identifying users by a unique identifier, such as a name.

The administration module 106 may command, control, store, manipulate, and receive data received by the system 10.

The administration module 106 may assign sources external to the system 10, including benefits vendors 40, identifiers and categorical designations. For example, benefits vendors 40 may be identified and characterized by billing type (e.g., self-bill, direct bill, list bill—short pay, or list bill—no short pay, bill as deducted), billing frequency, and/or enrollment period.

The data received by the system 10, including benefits information, may comprise discrete data elements. The administration module 106 may extract the discrete data elements from the data for processing.

Sample invoices from sources external to the system 10 may be received by the system 10, including the administration module 106. The administration module 106 may extract data from sample invoices, such as a vendor, for consolidation and reconciliation processes, or in administration of benefit plans. For example, the administration module 106 may extract data, such as pricing, billing terminology, or other vendor information, from a sample invoice from a specific benefit vendor 40. Sample invoices may be received the system 10 via an upload by a user.

The administration module 106 may standardize data from a plurality of external sources in a plurality of formats. That is, data in a plurality of formats from a plurality of external sources may be received by the system 10 and standardized for analysis and/or processing. Thus, data received by the system 10, may be converted to any other desirable format within the system 10, including by way of the administration module 106. Standardization of data received by the system 10 may result in one or more common data models within the system 10 for processing of the data. Common data models and the number thereof may be based on client and/or industry.

The administration module 106 may tag data received by the system 10. The administration module 106 may extract discrete data elements from data, including benefits information, and apply a tag to each data element. That is, discrete data elements of data, such as from a plurality of bills, invoices, and/or statements, may be tagged by the administration module 106 once the data is received by the system 10. The administration module 106 may apply an effective date tag to data received by the system 10.

The administration module 106 may onboard data, including user data, into the system 10. The administration module 106 may onboard data by, for example, receiving data, including enrollment data, from one or more external databases 20. The administration module 106 may onboard users by, for example, receiving and loading data, including data from external databases 20, mapping data to create group IDs, mapping data, including invoice data, for consolidation and reconciliation, mapping data to identify underlying details of data sought to be consolidated or reconciled, mapping data to identify underlying benefit plan details, assigning user security clearance, assigning user roles, adding vendor information, adding billing type(s), and/or adding financial information, including banking information.

The administration module 106 may associate users with one or more external sources, including third-party vendors, financial institutions, and/or financial accounts, including banking information.

The administration module 106 may assign users roles. Roles may include, for example, titles, such as exception approvers, brokers, finance, human resources, modifiers, personal identifying information (PII) viewers, human resources, financial administrators, protected health information (PHI) viewers, client administrators, and/or payment approvers. The administration module 106 may assign roles that are predetermined to be linked to a security clearance. The administration module 106 may separately assign user security clearances by, for example, designating users as entitled to access, modify, and/or transfer one or more of PII, PHI, or financial account information, or other sensitive information.

Different roles within the system 10 may have set or customizable privileges, accesses, and/or responsibilities. Security clearances may be changed over time via the administration module 106. Any changes to a user's security clearance may be effective immediately. For example, if a user of the system 10 is removed as a PHI viewer, the user will immediately be unable to view such information even if the user is currently using the system 10 to view PHI information.

The administration module 106 may purge data 107b from the system 10. Data may be purged 107b by manual action or at a predetermined time or date. The administration module 106 may be configured to purge 107b the data elements that have a particular timestamp based on a predetermined amount of time. The administration module 106 may purge 107b entirely from the system 10 the data and/or data elements that have a particular timestamp. Data may be purged 107b based on a timestamp applied to the data when it was received by the system 10. For example, the administration module 106 may have a default setting to purge data 107b after a predetermined amount of time lapses (e.g., 3 years (1095 days)) following the system's 10 receipt of the data.

At a designated time and/or date, whether based on manual action or a predetermined time and/or date, data may be automatically purged 107b from production, as well as backups, by the administration module 106. Data may be purged 107b first at a database layer, and then purged 107b from backups. All hot spares, disaster recovery, and ready to go spares may also purged 107b and/or purge 107b their own data upon manual action or at a predetermined time and/or date. Thus, in this way, and through use of time-stamping data when it is received by the system 10, the administration module 106 may identify and purge 107b all data from the system 10, globally, including at a predetermined time. The time period utilized for purging (whether by default or by manual action) may be customized for any user, contractual, and/or regulatory requirements, and localized on any particular data, data set, or data element based on data information, such as one or more data tag(s).

For example, a contract with a third-party vendor may require destruction of data received through an input port 102 within seven (7) years (84 months) after such data is received by the system 10. Such data may be appropriately tagged to designate the time and date the data was received and predetermine such data to be purged seven (7) years (84 months) after the system's 10 receipt of the data.

The system 10, including without limitation the administration module 106, may utilize authentication header (AH), as desired, when data is purged 107b. A certificate of destruction may be generated by the administration module 106 and provided to an external source, such as a client and/or user, and may be stored in database storage in the system 10, including without limitation in a data storage 162, for compliance purposes.

For short-term deletions, including 30-day deletions, data backups may be stored, by way of example, using standard retention functionality, such as techniques detailed in the DoD 5220.22-M (National Industrial Security Program Operating Manual) or NIST 800-88 (Guidelines for Media Sanitization) to destroy data.

The administration module 106 may monitor data security 107*a*. The administration module 106 monitors data security 107*a* by, for example, tracking data access for security purposes. For instance, all data may be tagged with information identifying the time(s), date(s) and/or person(s) accessing, viewing, and/or sharing tagged data. The administration module 106 may classify data based on security level. The administration module 106 may limit which data and/or data elements may be accessed by a particular user of the system 10 and/or username within the system 10 according to a security level associated with the particular user and/or username. The administration module 106 may track which data or data elements are accessed by the particular user and/or username and tracks which data or data elements the particular user or username attempted to access and/or modify.

The administration module 106 may monitor and record tagged data to create one or more datasets concerning the tagged data, including information concerning the time(s), date(s), and/or person(s) accessing, viewing, and/or sharing tagged data. In the circumstances of a security breach, it can thus be determined exactly what data and information was accessed, shared, and/or compromised, and by whom, and at what point in time. This limits what information may need to be deleted and/or shown as compromised. The accessed and/or tagged data may be filtered by any necessary field, such as by data type, data source, security classification, or any other data element.

The administration module 106 may also monitor data security 107*a* by, for example, tracking all actions initiated by a user of the system 10 any place within the system 10. For instance, the administration module 106 may track a unique identifier within the system 10, such as a username. The administration module 106 may log actions by users of the system 10 with accompanying information such as when the action occurred, by whom, what was changed, if anything, and to what degree (e.g., old value compared with new value). In the circumstances of a security breach, it can thus be determined what data was manipulated, how it was manipulated, by whom, and at what point in time. The administration module 106 may issue a notification or alert when certain data, for instance data with sensitive health information of insurance benefits recipients, is viewed, accessed, and/or manipulated within the system 10 or exported outside the system 10.

Data, including enrollment data, may be stored and managed in compliance with the highest security protocols and standards in the health insurance industry. For example, the system 10 may utilize NIST and HITRUST® framework to maintain data in secured and confidential manner. The system 10 may be configured to be compliant with NIST and HITRUST® controls. Compliance may be achieved through methods such as data segregation.

The system 10 may comprise a rules engine 110. Data, including benefits information, may be sent to and received by the rules engine 110. The rules engine 110 may analyze data and validate global and/or customer-specific rules for processing data.

The rules engine 110 may include one or more rules. The rules include, for example, one or more of state and/or federal laws, mandates, regulations, including compliance regulations and pricing regulations, pricing agreements, contractual agreements, restrictions and/or exceptions defined in contractual agreements, and/or any other user-defined rules. Rules comprising federal laws may, for instance, include the Affordable Care Act's provision to allow dependent coverage up to the age of 26 years old.

Pricing rules may, for instance, include prices for coverage, including negotiated prices that may be updated in real-time and/or applied retroactively. Contractual rules may, for instance, be based on contractual agreements, including negotiated contracts that may be updated in real-time and/or applied retroactively. Compliance rules may include, for example, any compliance rules, in any locality, state, or country, regarding any compliance issue, such as data hosting and/or residency compliance (i.e., personal data being stored in residence home country).

Other user-defined rules may include specified terms of certain benefits vendors 40 regarding issues such as retroactive application of corrective pricing. For instance, a contract with an insurance carrier may limit retroactive corrections of issued invoices to the preceding 6 months. Thus, if an insured failed to remove a dependent until 5 months after the dependent became ineligible for coverage, and then sought to remove the dependent, pricing excluding the dependent coverage may be retroactively applied due to the carrier's specific rules. Another carrier may in the same scenario limit retroactive corrective pricing to 2 months. Thus, pricing excluding the dependent coverage would only apply to the two months immediately preceding the insured's removal of the dependent and would exclude the $3^{rd}$, $4^{th}$, and $5^{th}$ month immediately preceding the removal of the dependent.

The rules engine 110 may enforce, apply, and process rules against data, including benefits information, received by the system 10.

The rules engine 110 may enforce rules against data to, for example, determine actions that may be taken by users of the system 10 in relation to the data, such as by determining available coverages for insurance benefits recipients for which the insurance benefits recipients are eligible. The rules engine 110 may likewise enforce rules against data to, for example, ensure that an insurance benefits recipient has the coverage for which they enrolled.

The rules engine 110 may enforce rules against data to, for example, determine discrepancies, issues, and/or exceptions concerning data within the system 10. Discrepancies, issues, and/or exceptions concerning data include, for example, misapplication of rules to data by a benefits vendor 40, including misapplication of rules concerning coverage eligibility or invoice amounts to be paid to benefits vendors 40, or inaccurate payments to benefits vendors 40 based on benefits information, such as coverage eligibility and/or pricing data. Discrepancies, issues, and/or exceptions may be identified within the system 10 by a tag or flag, which may be generated by the rules engine 110 or the administration module 106.

The rules engine 110 may monitor incoming and existing data, including benefits information, with respect to each applicable rule for any relevant to the rules. The rules engine 110 may monitor and flag data, including benefits information, for applicability of rules to data and identify any discrepancies, issues, and/or exceptions with data based upon the rules. Rules are enforced and/or applied by the rules engine 110 to data within the system 10 at all times the data is in the system 10. Consequently, any changes in the data, including benefits information, are continuously checked against the rules, and any changes in the rules are continuously checked against the data, to determine any changes to the applicability of old rules to old or new data, new rules to old or new data, and the effects thereof. The rules engine 110 may detect changes in benefits information and determine whether the changes produce exceptions based on the rules.

For example, a dependent child's eligibility to be insured under the child's parent's health insurance until the age of 26 may be a rule that is enforced by the rules engine 110. If an insured has a dependent child that turns 26 years old during a term of benefits enrollment, the rules engine 110 may retrieve rules, for instance from the rules database 112, and assess whether the child is still considered a dependent pursuant to applicable regulations (i.e., the rule) by assessing criteria such as age and disability status. If it is determined via the rules engine 110 that the child is no longer a dependent pursuant to the applicable rule, the rules engine 110 will issue a flag and/or indication and/or exception to that effect for processing. The rules engine 110 may also communicate with a processing unit 120 to identify and flag any discrepancies and/or exceptions in payments based on a change in the dependent-eligibility status. Discrepancies and/or exceptions concerning payments may be rectified, including automatically, via the processing unit 120. The processing unit 120 may consider and/or adjust past or future invoices and/or records to reflect an adjusted invoice amount based on the identified and/or flagged discrepancy. Thus, in this way, the rules engine 110 may effectuate payment modifications via the processing unit 120.

Dependent eligibility may optionally be determined via a dependent eligibility module 170. The dependent eligibility module 170 may be in communication with one or more of each of the other modules in the system 10. The dependent eligibility module 170 may ensure that enrolled dependents are eligible for coverage and review enrollment information to help users avoid later having to make expensive and difficult amendments and changes. Following the system's 10 receipt of enrollment information upload, each dependent may automatically checked and monitored for eligibility by the dependent eligibility module 170 when the new dependent appears in the enrollment feed, thereby ensuring that the insurance benefits recipient remains in compliance and is not paying costs and/or premiums for ineligible dependents.

The dependent eligibility module 170 may be in direct communication with insurance benefits recipients. The dependent eligibility module 170 may request and receive data from insurance benefits recipients concerning proof of dependent eligibility, including proof of disability. Such data from insurance benefits recipients may be received by the rules engine 110 for processing. The dependent eligibility module 170 may initiate a notification to an insurance benefits recipient to request data concerning dependent eligibility status. The request may be to, for example, provide proof of dependent status or disability.

As another example of rules applied by the rules engine 110, the rules engine 110 may assess and determine whether an insurance benefits recipient is eligible for certain coverages. For instance, the rules engine 110 may comprise a rule set by contractual agreement that may establish that certain benefit plans are only available in certain geographical locations (e.g., states, counties, cities, or zip codes). With such a rule, the rules engine 110 may monitor data with respect to where an insurance benefits recipient is living and flag and/or indicate when the insurance benefits recipient has moved outside the area in which the relevant coverage and/or plan is available or allowed. Likewise, the rules engine 110 may monitor data with respect to where an insurance benefits recipient is living and flag and/or indicate when the insurance benefits recipient has moved into an area in which the relevant coverage and/or plan is available. The rules engine 110 may then communicate with the processing unit 120 to identify and flag any discrepancies in payments based on a change in the location of the insured. The processing unit 120 may consider and/or adjust past and/or future invoices and/or records to reflect an adjusted invoice amount based on the identified and/or flagged discrepancy. The processing unit 120 may do so automatically. Thus, in this way, the rules engine 110 may effectuate payment modifications via the processing unit 120.

The rules engine 110 may process exceptions automatically. The rules engine 110 may process exceptions automatically based on previous manual approvals. By way of example, the rules engine 110 may automatically process an exception generated by a dependent's ineligibility for insurance coverage through the dependent's parent's health insurance after the dependent turns 26 years old by, for example, first determining that no data in the system 10 demonstrates continued eligibility, then automatically communicating with the processing unit 120 to consider and/or adjust past and/or future invoices and/or records to reflect an adjusted invoice amount based on the exception. These examples are but a few by which the rules engine 110 may identify discrepancies, issues, and/or exceptions with respect to data that changes over time.

The rules engine 110 may allow for rules concerning notifications that may be set by a client and applied to any data in the system 10. For example, a chief financial officer may desire an email and/or text message notification when an entity's self-funded (also known as self-insured) reserve level drops below a certain amount. The rules engine 110 allows for sending a notification in response to the identified circumstances via the administration module 106. Similar notifications may be generated in relation to any data in the system 10 as desired and/or required.

The rules may be stored in a rules database 112. The rules engine 112 may be updated continuously and/or periodically to include current rules, such as government/regulatory mandates & regulations, pricing agreements, contractual agreements, and/or any user-defined rules desired to be enforced against data in the system 10. The rules database 112 may have predefined rules for mandate and/or regulation sets, such as Affordable Care Act compliance, that a client may edit, engage, and/or disengage as required. The rules database 112 may be fed and updated automatically from a source external to the system 10. For example, sales tax rates, which is one example of a pricing rule, for cities, counties, states, or countries may be fed into the system 10 and automatically amended in real-time to reflect changes in such rates.

The administration module 106 may manage and/or update the rules applied by the rules engine 110 and/or the rules in the rules database 112. The administration module 106 may manage and/or update the rules by, for instance, revising rules, removing outdated rules, and/or adding new rules.

The system 10 may comprise a processing unit 120. The processing unit 120 may further comprise a consolidation module 130 and a reconciliation module 140.

The consolidation module 130 may receive data, including benefits information, optionally after it is processed by the rules engine 110. The consolidation module 130 may standardize data from a plurality of external sources in a plurality of formats into a single master ledger, invoice, and/or statement. That is, data in a plurality of formats from a plurality of external sources may be received by the system 10 and standardized for analysis and/or processing and combined together into a single master ledger, invoice, and/or statement. Thus, data received by the system 10, may be converted to any other desirable format within the system 10, including by way of the consolidation module 130.

Standardization of data received by the system 10 may result in one or more common data models within the system 10 for processing of the data. Common data models and the number thereof may be based on client and/or industry. The data, including for example benefits information, may then be consolidated by the consolidation module 130 to create a single bill, invoice, and/or statement that has been consolidated.

The consolidation module 130 may track a plurality of records, (e.g., bills, invoices, logs, receipts, purchase orders, or other records, including records related to the exchange of goods or services for monetary compensation) for a given entity (e.g., employer company, group benefits manager, insurance benefits recipient) from multiple benefits vendors, and consolidate the plurality of statements into one single statement for ease of administration, review, and processing. The single statement may present all relevant data, including for instance benefit costs, in a comprehensive format that is customizable for client needs. The consolidation module 130 may include or exclude an invoice that has an exception in the consolidated single statement.

The consolidation module 130 may be configured to segment a consolidated statement by any necessary grouping, such as by, for example, vendor, or in the context of clients having organizational relationship such as parent and subsidiary relationships, by subsidiary. The consolidation module 130 may also be customizable to satisfy any and all unique requirements from benefits vendors, users of the system 10, clients, and/or insurance benefits recipients with respect to outputs from the system 10. With the consolidation module 130, the system 10 may allow employers to offer their employees as many benefits as desired without increasing burdens, including administrative burdens, related to benefits management.

The reconciliation module 140 is configured to reconcile records, invoices, payments, pricing, evidence of insurability, payroll, and the like. The reconciliation module 140 may ensure that the amount to be paid to each payment recipient, including for instance benefits vendors 40, is accurately reconciled against relevant benefits information. The reconciliation module 140 may ensure that the amount to be paid to each payment recipient for each benefit for which an enrollee is properly enrolled is accurately reconciled against relevant pricing and enrollment information. The reconciliation module 140 may be configured to reconcile against multiple feeds of benefits information to ensure accurate deductions and confirm evidence of insurability. The reconciliation module 140 may prevent or reduce inaccurate billing and/or payments, such as overpayment in premium payments (i.e., premium leakage) or duplicate payments, and ensure that the enrollee in coverage has coverage. The reconciliation module 140 may be configured to reconcile health insurance information for any and all health insurance types.

The reconciliation module 140 may review all data, including benefits information, in the consolidated bill, invoice, and/or statement after it is standardized and consolidated by the consolidation module 130. The reconciliation module 140 may review all data in the consolidated bill, invoice, and/or statement to determine the accuracy of data in the consolidated bill, invoice, and/or statement. Specifically, the reconciliation module 140 may monitor, add or remove, perform true-ups, and/or reconcile data, such as invoices, received from external sources, including the benefits vendors 40, with any other data, such as benefits plan data and/or pricing data, that a user desires to be reconciled. The reconciliation module 140 may adjust consolidated bills, invoices, and/or statements that need to be reconciled. The reconciliation module 140 is configured to assess metrics like enrollment effective dates managed by the system 10. The reconciliation module 140 is configured to map at any point in time metrics such as an enrollee's enrollment, coverage level, and price level within any given time period based on data within the system 10.

The reconciliation module 140 is configured to reconcile against numerous data feeds, like payroll, to ensure accurate deductions and confirm metrics or characteristics such as evidence of insurability. Enrollee metrics like evidence of insurability are continually monitored to ensure billing accuracy prior to the payment of invoices.

The reconciliation module 140 may generate an exception report of the inaccuracies and/or inequalities detected in invoices and transmit the report to a client device 60.

With the reconciliation module, the processing unit 120 may adjust both discrete amounts within a consolidated bill, invoice, and/or statement and the total amount of a consolidated bill, invoice, and/or statement, each of which may be sent to a client electronic device 60.

For example, the processing unit 120 may receive a record, such as an invoice, from a source external to the system 10, such as an insurance carrier, that seeks payment of $100 for an insurance benefit premium related to an insurance benefit recipient. The reconciliation module 140 may reconcile this invoiced amount with the plan data and/or pricing data related to the insurance benefits recipient. The reconciliation module 140 may, for instance, determine the $100 payment should not be paid at all because the insurance benefits recipient was not enrolled in the applicable insurance coverage during the time period relevant to the invoice. In this circumstance, for example, the processing unit 120 may flag the insurance benefits recipient's lack of coverage for resolution and/or communicate directly with the carrier regarding the lack of coverage for the insurance benefits recipient. This communication may be processed automatically. The reconciliation module 140 may, alternatively, determine that a $90 payment should be paid instead of a $100 payment because the insurance premium pricing related to the insurance benefits recipient shows $90 is the correct premium price. In this circumstance, for example, the processing unit 120 may flag the identification of a premium discrepancy for resolution and/or adjust the specific invoice, whether or not it is included in a consolidated bill, invoice, and/or statement, to reflect the adjusted invoice amount of $90 when the invoice is sent to a client electronic device 60. This adjustment, and other adjustments, may be processed automatically.

The reconciliation module 140 may monitor, add or remove, perform true-ups, and/or reconcile data, such as invoices, received from external sources, including the benefits vendors 40, with any other data, such as benefits plan data and/or pricing data, before or after data is consolidated into a single bill, invoice, and/or statement.

The reconciliation module 140 may apply effective dates and stamping, including time-stamping, to data when and/or after it enters the system 10. Maintaining effective dates and time-stamping on the data and information in the system 10 may assist in allowing for up-to-the-minute, accurate billing in real-time to account for things like coverage changes, new coverages, and/or new rates.

The reconciliation module 140 may reconcile specific data in bills, invoices, and/or statements retroactively. For example, an annual premium rate for a given vendor may not be finally negotiated until March 1, despite the coverage beginning on January 1. During the months of January and February, an estimated amount of $100 may have been collected for the purposes of the relevant benefit. The fully negotiated rate determined on March 1 may, for instance, be $120. Once the rate is set at $120, the reconciliation module 140 may retroactively process the January and February collections. This may be accomplished by having an effective date corresponding with the $100 payment end on March 1 (after having begun on January 1) and setting a new effective date for the $120 rate begin on January 1. In view of these effective dates, the reconciliation module 140 will consider the $100 payment in January and February to ensure the insurance benefits recipient is billed the correct amounts in January, February, and thereafter. Discrepancies in payments may be rectified, including automatically, via the processing unit 120. Thus, in this way, the reconciliation module 140 may effectuate payment modifications via the processing unit 120.

By way of further example, an insurance benefits recipient may be enrolled in coverage for employee plus spouse for all benefits. The employee and spouse may have a child in October 2017, but not be required to notify the employee's employer of a coverage change to include the child (i.e., change to a family plan) until December 2017. The employer may not update the enrollment system or benefits vendors until Jan. 1, 2018. These circumstances have the potential to create a variety of billing and coverage errors, such as failing to bill for family plan coverage in October, November and December 2017 at 2017 rate amounts, failing to provide full coverage between October and January 1, and/or charging the employee the 2018 family plan rate beginning in October 2017. The reconciliation module 140 in the system 10, however, may utilize the effective dates applied to the plan and enrollment data when it enters the system 10 to identify an effective date beginning in October 2017 for family plan coverage. This effective date may be applied over the existing effective date of employee plus spouse coverage between October 2017 and December 2017. The reconciliation model 140 may be configured to calculate any delta in 2017 rate for employee plus spouse for October, November, and December 2017 and the family plan rates for those same months, and then retroactively charge the delta to the insurance benefits recipient. Discrepancies in payments may be rectified, including automatically, via the processing unit 120. The processing unit 120 may consider and/or adjust past or future invoices and/or records to reflect an adjusted invoice amount based on the identified and/or flagged discrepancy. Thus, in this way, the reconciliation module 140 may effectuate payment modifications via the processing unit 120. The 2018 rates for employee plus family would be charged on all invoices following Jan. 1, 2018.

The reconciliation module 140 is configured to reconcile any data or data element in the system 10 against any other data or data element in the system 10. Rules and algorithms to accomplish reconciliation may be stored in the rules engine 110, rules engine database 112, and/or one or more trained neural networks 108 and 122.

The rules may be subject to one or more rules themselves, or sub-rules. For instance, rules may be subject to sub-rules in the form of tolerances. A tolerance may be a sub-rule that, when the reconciliation module reconciles an invoice to within $0.01, no exception is triggered. A sub-rule such as this may be learned by the system 10, including without limitation by the one or more trained neural networks 108 and 122, after manual processing of previous exceptions or automatically based on user feedback concerning the exception, such as when a payment is made in relation to the invoice that disregards the $0.01 exception. Tolerances may be customizable based on any suitable need, including by client or industry, and to any desirable degree (e.g., $5, $10). The system's 10 response to sub-rules may also be customizable. For instance, as shown above, a pricing tolerance may be disregarded. However, a pricing tolerance may, for instance, be automatically incorporated into the next invoice, or an invoice at the end of a fiscal year, as desired.

After reconciliation is complete, the system 10, including without limitation the processing unit 120, may transmit one or more reconciled bills, invoices, and/or statements via an output port 104. The system 10, including without limitation the processing unit 120, may transmit one or more reconciled bills, invoices, and/or statements via an output port 104 to a client electronic device 60. The one or more reconciled bills, invoices, and/or statements may be consolidated into a single bill, invoice, and/or statement that may have been consolidated by the consolidation module 130 from a plurality of sources, including sources external to the system.

The consolidated bill, invoice, and/or statement may comprise one or more adjusted invoice amounts based on processing by the system 10 as described herein and calculated by the processing unit 120. The adjusted invoice amounts may comprise adjustments to specific bills, invoices, and/or statements, adjustments to a total consolidated bill, invoice, and/or statement, or both.

The adjusted invoice amount may be less than, equal to, or more than the amount of the relevant original bills, invoices, and/or statements received by the system 10. For instance, when a bill, invoice, and/or statement is reconciled and determined to be accurate by the disclosed system 10, the adjusted invoice amount may be 100% and/or the same as the amount of the relevant original bill, invoice, and/or statement. Alternatively, when a bill, invoice, and/or statement is reconciled and determined to seek a payment more than that which the issuer (e.g., a benefits vendor 40) is owed, the adjusted invoice amount may be less than 100% of the amount of the relevant original bill, invoice, and/or statement. Alternatively, when a bill, invoice, and/or statement is reconciled and determined to seek a payment less than what which the issuer (e.g., a benefits vendor 40) is owed, the adjusted invoice amount may be more than 100% of the amount of the relevant original bill, invoice, and/or statement.

The processing unit 120 may calculate an adjusted invoice amount by excluding a fee associated with an exception. The processing unit 120 may determine whether to include, exclude, or modify an invoice which has an exception based on a feedback signal from the client device 60.

The client electronic device 60 may be a smart phone, computer, tablet, or any other processing device. A client may be, for example, an insurance benefits recipient, third-party vendor, or insurance carrier.

Reconciled bills, invoices, and/or statements may be exported to the client electronic device 60 as a data feed in any suitable format, including without limitation a downloadable file, via the processing unit 120.

The administration module 106 may be configured to send a paper copy of a bill that has been consolidated automatically to the designated postal address for a specific group and/or subgroup of clients or insurance benefits recipients.

The system 10 may comprise a payment processing module 150. The payment processing module 150 may enable and facilitate payment exchanges. The payment processing module 150 may process and electronically execute financial transactions. The payment processing module 150 may be configured to process wire, ACH financial, and credit or debit card transactions. The payment processing module may facilitate disbursement of money to one or more recipients, including benefits vendors 40, from a single payment or single deposit of funds.

The payment processing module 150 may be configured to break down consolidated bills, invoices, and/or statements by characteristics such as client, vendor, department, and/or account to determine specific payments to specific recipients. The payment processing module 150 may separate and/or or combine payments based on such characteristics to consolidate payments and minimize administrative burdens.

For instance, a plurality of bills, invoices, and/or statements may be reconciled, consolidated into a single bill, invoice, and/or statement, and transmitted to a client electronic device 60 via the system 10. The consolidated bill, invoice, and/or statement may seek a total payment of $100, $75 of which is owed to one benefits vendor 40 and $25 of which is owed to another benefits vendor 40. The operator of the client electronic device 60 may make a single payment of $100 that may be separated into two payments (one payment of $75 and one payment of $25) via the payment processing module 150 to be paid to two different benefits vendors 40.

The system 10, including without limitation the administration module 106 and processing unit 120, may comprise one or more trained neural networks 108 and 122. The trained neural networks 108 and 122 may log, record, and assess the system 10's processing of rules with respect to all data, including benefits information, within the system 10. The trained neural networks 108 and 122 may be configured to analyze data, including benefits information, to determine optimal benefits, plans, and coverage for which an insurance benefits recipient is eligible in a cost-effective manner to provide and/or propose to a benefits vendor, user, client, and/or insurance benefits recipient.

The trained neural networks 108 and 122 may be configured to instruct the processing of data within the system 10 based on manual resolution of exceptions identified with respect to data in the system. The trained neural networks 108 and 122 may learn to process data according to past manual processing of data within the system 10. The trained neural networks 108 and 122 may create new rules to be applied by the rules engine 112 based on information learned by the trained neural networks 108 and 122. The administration module 106 may manage and/or update the rules in the rules database 112 by way of the trained neural networks 108 and 122.

For example, default rules in the rules engine 110 of the system 10 may dictate that dependents are not eligible for insurance coverage over the age of 26 years old as determined by federal mandate. However, a specific carrier may dictate that dependents are eligible for insurance coverage until the age of 27, over and above the federal minimum requirements of 26 years of age if, for instance, the child was disabled. An exception may be generated by, for example, the reconciliation module 140 after the dependent turns 26 years old to note the purported lack of coverage on the dependent's parent's health insurance plan. If the exception is resolved to reflect dependent coverage until the age of 27 years old for this specific carrier and this specific enrollee's dependent, the trained neural networks 108 and 122 may automatically assess what other insurance benefits recipients are subject to the specific carrier's unique eligibility allowances. The trained neural networks 108 and 122 may also automatically create a rule to the effectuate similar results for other insurance benefits recipients.

By way of further example, the system 10 may identify overpayments for $25, $50, and $100 on three separate invoices, respectively, paid to an insurance carrier and notify the insurance carrier of the overpayments. The insurance carrier may, for example send in response to the notification a single payment of $125 without identifying what overpayments were agreed to as being overpaid. The trained neural networks 108 and 122 may assess the payment of $125 and determine that only two of the three overpayments, specifically the $100 and $25 overpayment, were agreed to be overpayments by the carrier based on what calculations are possible to add up to the $125 payment. That is, the trained neural networks 108 and 122 know that only the $100 and $25 overpayments were agreed to because the $50 overpayment could not be combined with either the $100 or $25 overpayments to total $125. The trained neural networks 108 and 122 may then, including automatically, flag and/or issue a notification within the system 10 that the $50 overpayment was not agreed to for further processing. The trained neural networks 108 and 122 may also and/or in the alternative, including automatically, create a new rule that the $50 overpayment is not in fact an overpayment based on, for instance, the carrier's non-payment of the $50 overpayment and/or processing of the notification that the $50 overpayment was not agreed to. The trained neural networks 108 and 122 may also and/or in the alternative, including automatically, generate a communication to be sent to a benefits vendor 40, user, client, and/or insurance benefits recipient regarding the non-payment of the $50 overpayment.

The processing unit 120 may include a trained neural network 122 which analyzes past feedback signals from a client device 60 relating to previous actions taken with respect to exceptions. The trained neural network 122 may automatically instruct the processing unit 120 as to how to calculate a adjusted invoice amount for an invoice that has an exception.

The trained neural networks 108 and 122 may analyze benefits information via algorithms and/or learning algorithms. The learning algorithms may be customizable based on client needs. The trained neural networks 108 and 122 may analyze data in conjunction with the rules engine 112 or any data in the system 10. The trained neural networks 108 and 122 may send data outputs to recipients external to the system, including without limitation benefits vendors 40, clients, users, and/or insurance benefits recipients, that may be are customizable to reflect client needs.

The system 10, including without limitation the trained neural networks 108 and 122, may utilize natural language processing. Natural language processing may be utilized to communicate with benefits vendors 40, users, clients, and/or insurance benefits recipients concerning benefits information. For example, the trained neural networks 108 and 122 may generate a note identifying the purpose(s) for the exception. The text of the note may be generated by way of natural language processing.

In some embodiments, the system 10 may comprise a data analytics module 180. The data analytics module 180 may be in communication with one or more of each of the other modules in the system 10. The data analytics module 180 may analyze data, including enrollment data, benefits offerings, and costs to determine optimal benefits, plans, and coverage to provide and/or propose b2 to an insurance benefits recipient in a cost-effective manner. The data analytics module 180 may analyze such data, offerings, and costs in conjunction with the trained neural networks 108 and 122. The data analytics module 180 may analyze such data, offerings, and costs via algorithms. The data analytics module 180 may be customizable based on client needs. The data analytics module 180 may be adapted to provide actionable insights b2 into benefit offerings and enable for improved decision-making by benefits vendors 40, users, clients, and/or insurance benefits recipients. The data analytics module 180 may send data outputs b2 to recipients external to the system 10 that may be are customizable to reflect client needs. For example, the data analytics module 180 may generate reports b2 showing types of coverage in place for insurance benefits recipients based on filtered criteria, such as zip code.

The data analytics module 180 may be configured to analyze benefits information, exceptions determined by the system 10, actions taken in response to exceptions, and/or payments owed and/or made pursuant to the benefits information. The data analytics module 180 may generate and transmit a report b2 concerning the foregoing analysis. The data analytics module 180 may determine a historical trend of savings and/or spending, carrier issues, billing issues, exceptions, and/or benefits usage based on the analysis and generate and transmit a report b2 with the analysis and historical trend(s) to benefits vendors 40 or a client device 60. The data analytics module 180 may utilize data and analytics modules such as actuarial tables to analyze in relation to historic or anticipated spending levels concerning insurance benefits recipients. The data analytics module 180 may be configured to determine a prospective budget for future costs related to insurance and/or benefits. The data analytics module 180 may send a report b2 comprising prospective budgets to benefits vendors 40 or a client device 60.

The system 10 may further comprise a vendor reporting module 160. The vendor reporting module 160 is configured to automatically remit information al to external sources, including, benefits vendors 40. The vendor reporting module 160 may also be configured to automatically remit payments al to external sources, including benefits vendors 40.

Certain vendors, including benefits vendors 40, may require specific information to be included upon receipt of paid invoices. The specific information required to be included may be logged in the vendor reporting module 160. The vendor reporting module 160 may generate and output the specific information required by the vendor to be included with payment for a relevant invoice.

For example, a stop loss provider may require a note to accompany a payment that the provider applies to a specific client. By way of further example, vendor reporting may include enrollment information and invoice exceptions determined by the system 10.

By way of further example, benefits vendors 40 may be notified by the system 10, including without limitation by the processing unit 120 or vendor reporting module 160, immediately when there is a billing error. This assists in allowing clients to adhere to any contractual agreements to identify billing issues in a set period of time (e.g., 30 to 60 days) and prevent having a bill stand after the contractually agreed-upon time period to object has expired. The vendor reporting module 160 thereby may further stops overpayments to vendors. The information remitted by the vendor reporting module 160 is customizable to meet all client specific needs.

Data, including time-stamped data, may be associated with certain information within the system 10. For example, an insurance benefits recipient's enrollment information may be updated based on a data's timestamp when the enrollment information is susceptible to changing over time. For instance, enrollment information of a dependent may be updated when a dependent turns 26 years old and loses eligibility for insurance coverage as a dependent. By further way of example, enrollment information may be updated based on a date when the terms of a benefit package are negotiated in a given month (e.g., March 1 of a given) and then retroactively applied as of an earlier date of the same year (e.g., as of January 1).

The applicability of rules information may be contingent upon time, and thus whether the rules of the rules engine 110 apply to certain data may be based on the timestamp. For instance, rules concerning dependent coverage may be applied only while a insurance benefit recipient is a legal dependent. Such rules may no longer be applied when the insured is no longer a legal dependent.

Security information may likewise be contingent upon the timestamp received by data. For example, certain data may have a security clearance or heighted security clearance for only a certain amount of time the data is in the system 10 (e.g., 1 year ((365 days)).

Purge instructions may also be contingent upon the timestamp received by data. For instance, the system 10 may automatically purge data from the system 10 based on the timestamp.

Financial information may also be contingent upon the timestamp received by data. For instance, certain payments for certain bills may be made from a certain account based on the time-period during which the payment is due.

All data and data tags may be viewed or sorted by time period, or any applicable filter.

A copy of all incoming data and information may be stored, including in data storage 162, in its original format for reference. Data in the system 10 may be natively accessible through a secure API by other vendors, partners, clients, and the like.

Figure 2:
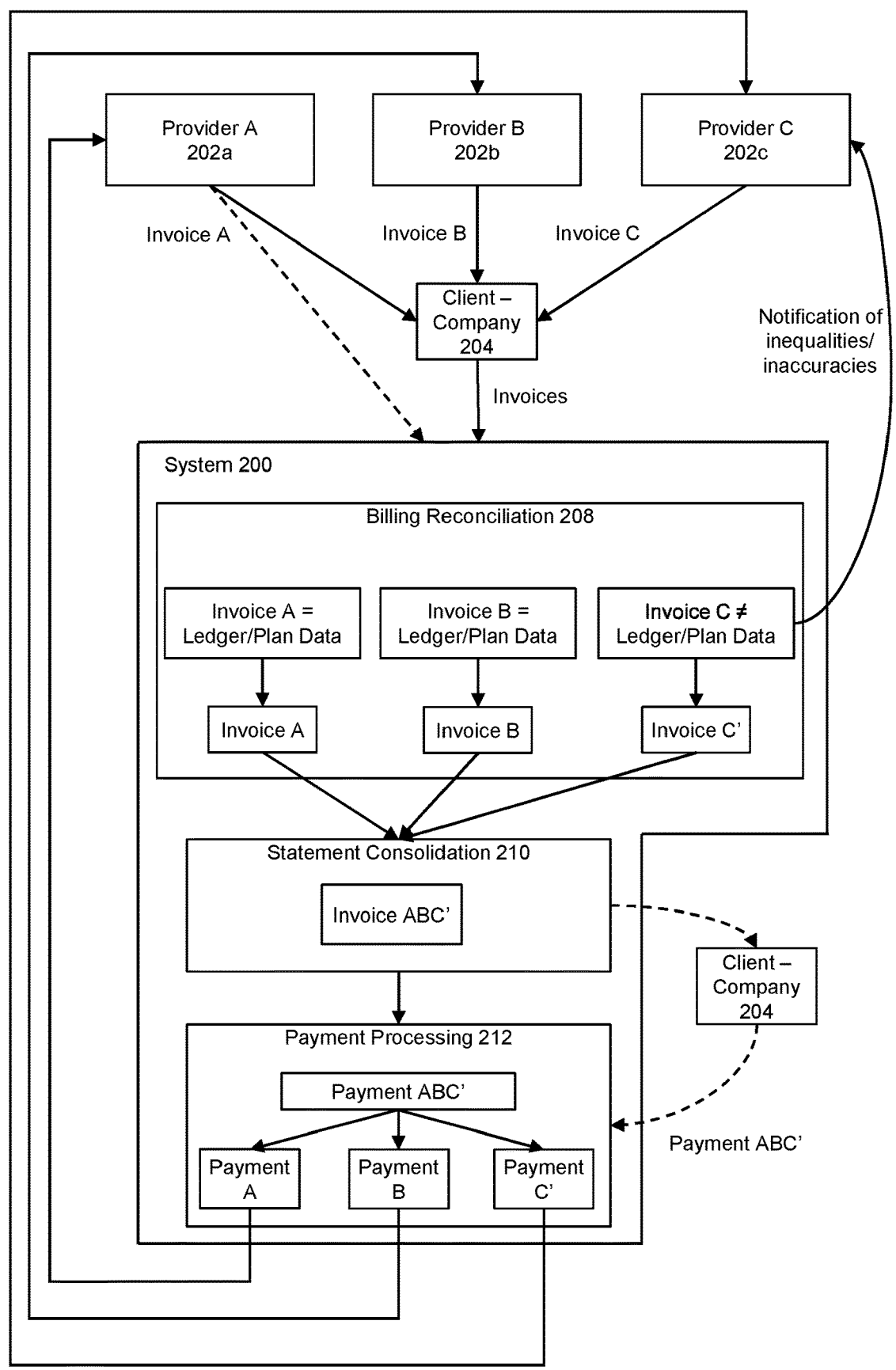
FIG. 2 is an illustrative schematic showing the various components of the consolidation and reconciliation system according to the present teachings.

Referring to FIG. 2, a consolidation and reconciliation system 10 according to the present teachings is shown. A plurality of insurance benefits providers 202a, 202b, and 202c issue a plurality of invoices (invoices A, B, and C) to a client-company 204. The plurality of invoices received by the client-company 204 are transmitted to a system 200. Invoices may optionally be transmitted directly from a provider (e.g., provider 202a) to the system 200.

Invoices A, B, and C are reconciled 208 within the system 200. Invoices A, B, and C are reconciled by determining any inequalities between the invoice amounts and, for example, plan and pricing data within the system 200. If an inequality is determined, for instance an inequality with Invoice C, a calculation as to the degree of inequality is made and a notification explaining the inequality may be sent to the relevant provider (e.g., provider 202c). The invoice including the inequality may be adjusted to the correct amount C' based on the calculation.

Once invoices A, B, and C' are fully reconciled, they may be consolidated 210 within the system 200 into a single invoice ABC'. The single invoice may be transmitted to client-company 204. If a payment from client-company 204 is required, client-company 204 may make a single payment ABC' to resolve each of the invoiced amounts for invoice A, B, and C'. The payment may then be processed 212 within the system 200. Instead of sending the single invoice ABC' to the client-company 204, the single invoice ABC' may alternatively proceed straight to processing 212 within the system 200, for instance in circumstances of pre-approved payment authorization.

Single payment ABC' may be separated by payment processing 212 into distinct payments A, B, and C' within the system 200. Distinct payments A, B, and C' may be directed to the relevant providers 202a, 202b, and 202c as distinct payments.

Figure 3A:
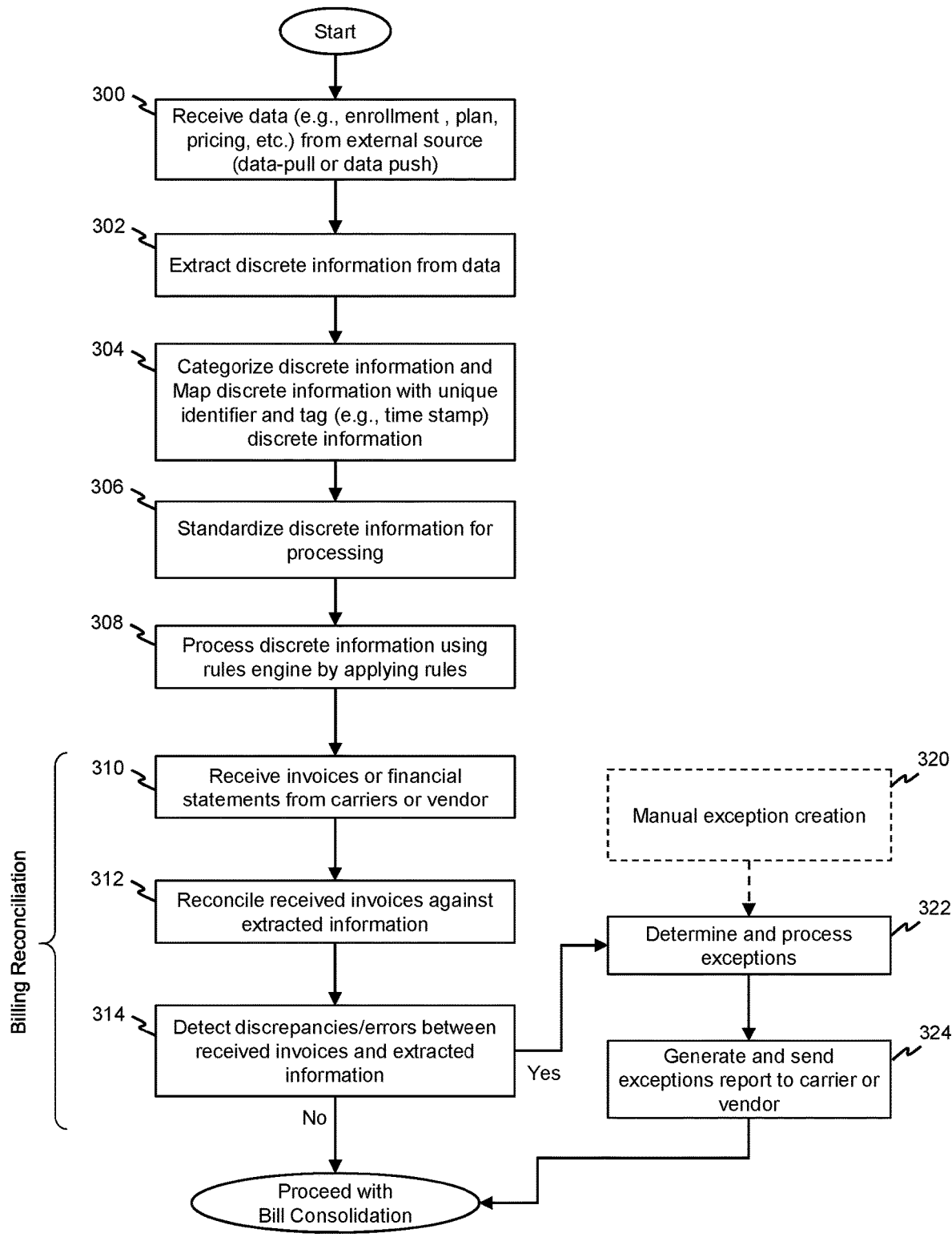
FIGS. 3a-3b depict an illustrative flow chart showing a method for consolidation and reconciliation and optional payment processing according to the present teachings
Figure 3B:
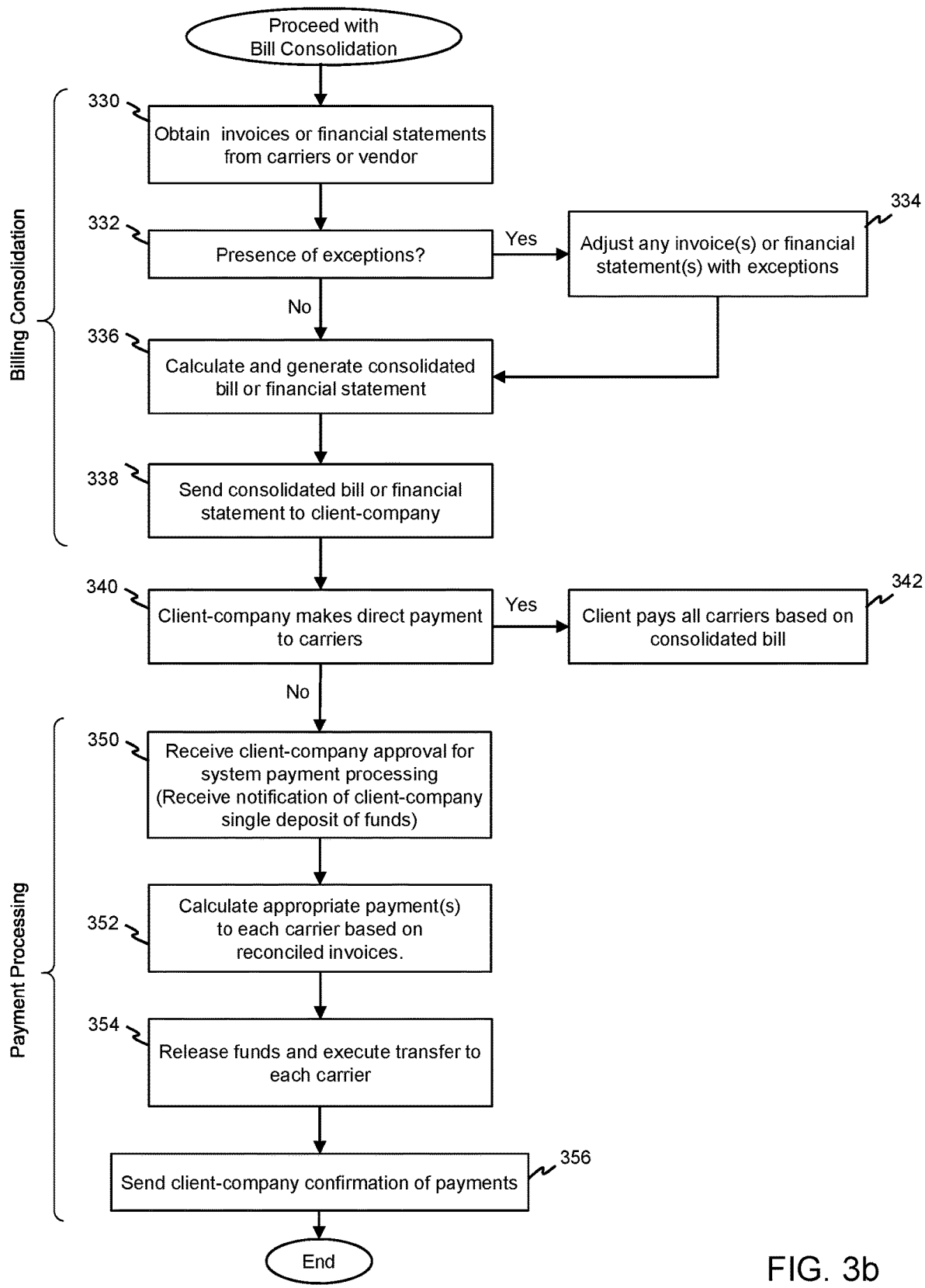

Referring to FIGS. 3a & 3b, there is shown a process of consolidation, total reconciliation, and optional payment processing. Referring to FIG. 3a, data is received 300 from one or more external sources. Discrete information is extracted 302 from the data. The discrete information is categorized, mapped with a unique identifier, and tagged 304. The discrete information is standardized 306 for processing. The discrete information is processed 308 using a rules engine by applying rules. One or more bills, invoices, and/or statements are received 310 by benefits vendors. The one or more bills, invoices, and/or statements are reconciled 312 against the extracted information. Discrepancies, errors, inequalities, and/or exceptions between the one or more bills, invoices, and/or statements and the extracted information are detected 314. Discrepancies, errors, inequalities, and/or exceptions may be created 320 manually. Detected discrepancies, errors, inequalities, and/or exceptions, if any exist, are processed 322. A report of discrepancies, errors, inequalities, and/or exceptions, if any exist, is generated and sent to the benefits vendor.

Referring to FIG. 3b, one or more bills, invoices, and/or statements from a benefits vendor are obtained 320. The presence of exceptions related to the one or more bills, invoices, and/or statements is ascertained 332. The one or more bills, invoices, and/or statements are adjusted 334 as necessary pursuant to the exceptions, to the extent any exist. A consolidated bill, invoice, and/or statement is calculated and generated 336. The consolidated bill, invoice, and/or statement is sent 338 to a client-company. Whether the client-company makes direct payments to the benefits vendor is ascertained 340. If the client-company makes direct payments 342 to the benefits vendor, client-company pays carriers based on consolidated bill, invoice, and/or statement. If client-company does not directly pay benefits vendor, client-company provides approval for system payment processing via notification or single deposit of funds 350. The amount of money owed by the client-company to each vendor is calculated 352 based on reconciled invoices. Funds are released 354 to vendor and financial transaction is executed. A payment confirmation is sent 356 to the client-company.

Additionally, when a new client joins the system 10, an order process may be initiated. The new client may complete an order form in the system 10. The new client may be accepted or rejected. If accepted, client onboarding may be initiated. The new client's users may register to access the system 10 and may be approved for system 10 access. Data, such as benefits information, may be received by the system 10. The new client may upload client data such as benefits carriers, plan & pricing information, rules, and other information into the system 10. Alternatively, and/or in addition, the enrollment information may be fed to the system 10 directly from the external database(s) 20 that a client is already using, and administrators and data manipulation rights-holders may be identified. The client may optionally upload banking and financial information. Rules, such as federal, state, and local rules and mandates, and other client-specific information, such as terms of contractual agreements, are received by the rules engine 110. The rules engine 110 may validate global and customer-specific enrollment rules before processing for reconciliation and consolidation. The amount of premiums due based on enrollment information and exceptions generated by the rules engine 110 and processed within the system may be calculated. Calculated invoices may be reconciled with received invoices and any exceptions, if any exist, identified by the system 10 or manually entered. Exceptions may be processed and credits and/or adjustments may be applied as necessary based on resolution of exceptions. One calculated, consolidated, and reconciled bill may be generated. The bill may have additional exceptions or adjustments carried over from a previous billing cycle. The bill that has been consolidated is then paid as desired by the client, including optionally through a single payment that may be broken down by any desired grouping. The client may pay all carriers based on the consolidated and reconciled bill. The client may optionally pay carriers through the system's payment processing module 150. Payments may be approved and funds may be transferred. The system 10 may either pull payments and reconcile them or push payments to guide a payroll system 150.

Figure 4:
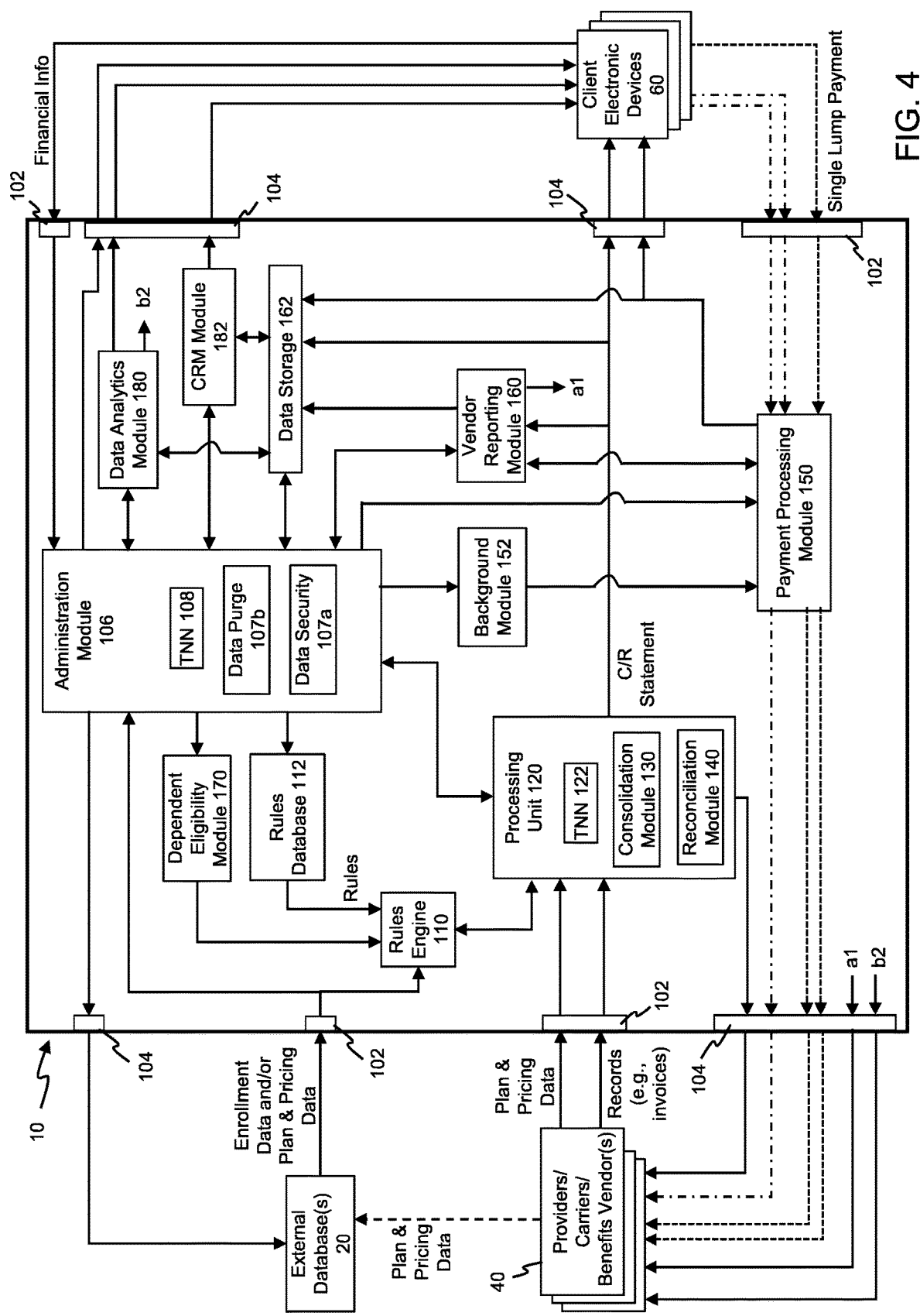
FIG. 4 is an illustrative block diagram of a consolidation and reconciliation system according to the present teachings.

Referring to FIG. 4, what is shown is the system of FIG. 1 further comprising a background module 152 and a customer relations management/commissions (CRM/Commissions) module 182. The background module 152 may be configured to keep track of global banking holidays and other banking requirements. The background module 152 may ensure payments are submitted dynamically to be paid on time depending on the amount due, how payments are processed by the system 10, and the holidays. Such banking requirements are complex and subject to change, and are different between bank to bank, country to country, or between countries, and can depend on variables such as payment types or amounts. For example, a large dollar amount ACH has to be submitted to a US bank on a non-banking business day before the money is able to be processed. The background module 152 may consider this information to ensure payments are made on time.

The system 10 may further comprise a customer relations management/commissions (CRM/Commissions) module 182. The CRM/Commissions module may be pre-configured with desired functionality for entities selling and/or managing insurance, benefits and/or voluntary benefit products. The pre-configured CRM/Commissions module 182 may comprise various stock characteristics such as a security and compliance framework. The CRM/Commissions pre-configured framework may be usable by an entity as soon as the entity is identified as needing the configuration, for instance through a contractual change in customer type. The CRM/Commissions module 182 may be configured to be in communication with one or more of each of the other modules in the system 10. This allows for efficient management of a client's sales and renewal cycle.

The CRM/Commissions module 182 may further be configured to track specific data in the system 10, such as broker's commissions, and client performance, pricing, and payment information. Information such as the brokers' commissions may be calculated, including by way of the processing unit 120, and derived from data within the system 10. Information such as the brokers' commissions may be directly sent to an external source, such as a broker, from the CRM/Commissions module 182. Payments to the external source, such as the broker, may be automated via the payment processing module 150. One or more reports, including commission reports, may be sent from the system 10 to one or more recipients external to the system, including without limitation a broker or a broker's payroll department.

The CRM module 182 may allow for all data in the system 10 to be available in one place. This allows users of the CRM module 182 to quickly see not only typical CRM information of a specific client, such as general contact information, but also access and see the client's performance, reserve levels, enrollment numbers, utilization (etc.) in one place.

Figure 5:
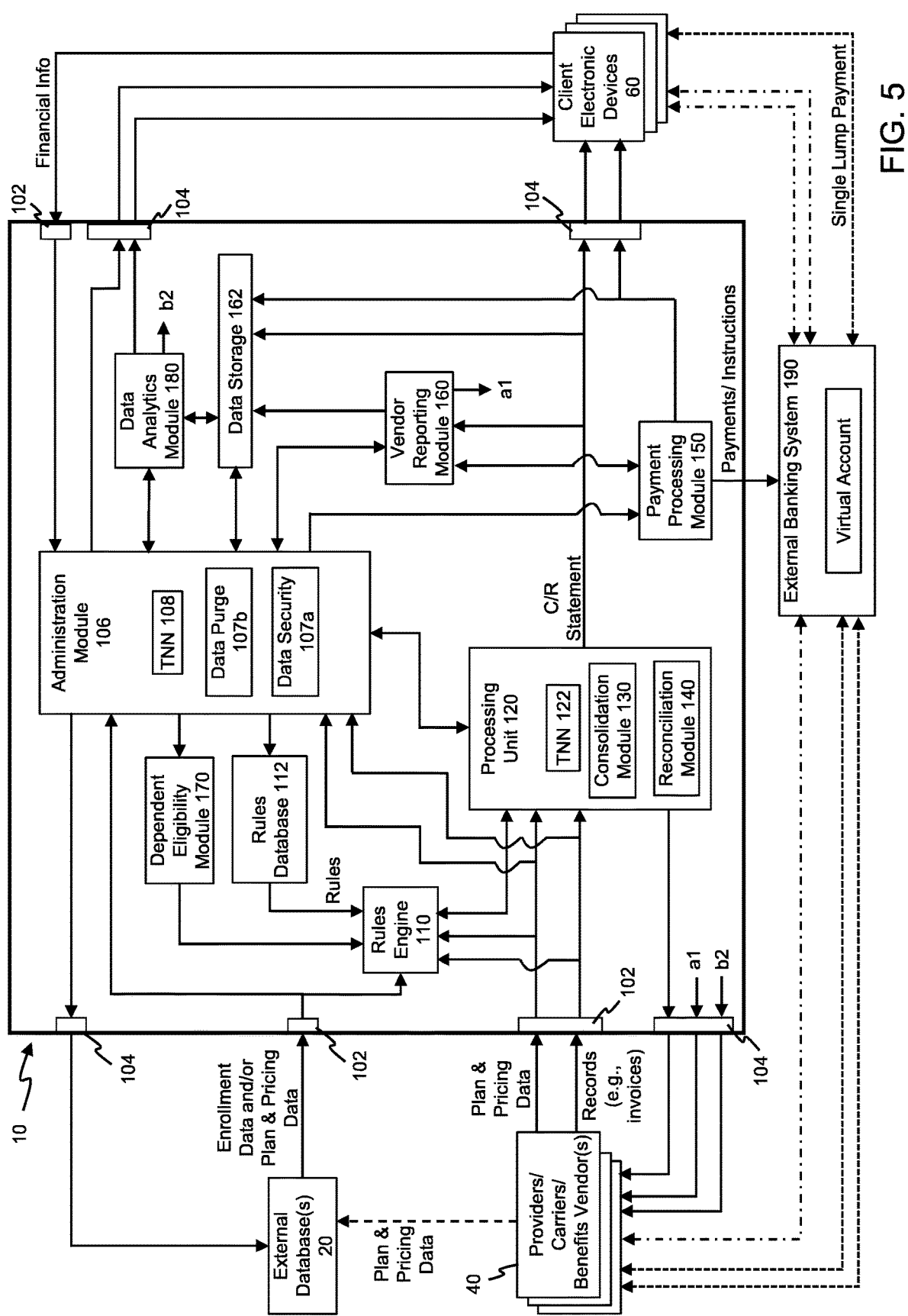
FIG. 5 is an illustrative block diagram of a consolidation and reconciliation system according to the present teachings.

Referring to FIG. 5, what is shown is the system of FIG. 1 in in relation to an external banking system 190. The payment processing module 150 may take a single payment, paid by a client, for example, and separate the payment while in transit in the external banking system to be accurately and timely delivered to distinct recipients. Specifically, payments from an external source, such as a client, may be passed through a temporary, virtual account within the external banking system 190 owned by the client and facilitated by the payment processing module 150. The virtual account may receive authorization from the client to accept payment instructions from the payment processing module 150 concerning the distinct recipients of payments made from the virtual account. For example, the virtual account may receive instructions from the payment processing module 150 to move payment from the client's primary bank account into the virtual bank account. The virtual account may then accept further instructions from the payment processing module 150 to divide the payment from the client's primary bank into discrete amounts that may be sent to distinct recipients, including for example benefits vendors 40.

The instructions generated by the payment processing module 150 as to payment recipients and payment amounts may be derived from the single, consolidated, and reconciled statement generated by the processing unit 120.

In similar fashion, the payment processing module 150 is further configured to take separate payments from distinct clients and combine them while in transit in the external banking system 190 to be accurately and timely delivered to the relevant recipient as a single payment. That is, the payment processing module 150 may also combine payments from multiple sources, such as multiple clients, to remit a combined and/or single payment to a distinct recipient, such as a single benefit vendor 40. Individual clients (e.g., insurance benefits recipients) may also directly access the system 10, add financial information, including for instance bank account or credit or debit care information, and have their payments processed by the payment processing module 150 in similar fashion. Such payments may be combined with other individual clients (e.g., insurance benefits recipients) in a virtual account by the payment processing module 150 for the payment processing module's 150 remittance of a combined and/or single payment to a distinct recipient (e.g., a benefit vendor 40). Clients may identify how they desire a financial transaction to occur (e.g., wire/ACH/debit/credit).

In similar fashion, the payment processing module 150 may take payments from distinct departments within a single client and combine them while in transit in the extern banking system 190 to be accurately and timely delivered to the relevant recipient as a single payment. In similar fashion, the payment processing module 150 may take payments from distinct collections of financial resources (e.g., money in specific accounts), and combine them while in transit in the external banking system to be accurately and timely delivered to the relevant recipient as a single payment.

The payment processing module 150 may also effectively automate chargebacks between corporate organizational relationships, such as parents and subsidiaries. In this way, the payment processing module 150 automates chargebacks and minimizes accounting in corporate organizational relationships. The payment processing module 150 likewise is configured to minimize accounting for associations and captives and allow associations and captives to accurately chargeback members. The payment processing module 150 is further configured to process reserve management for self-funded clients and process consolidated claims payments.

The payment processing module 150 may communicate with the external banking system 190 which has an account that received a single deposit of funds. The payment processing module 150 may send one or more instructions to the external banking system 190 to separate the single payment or the single deposit of funds into multiple payments and to transmit the multiple payments to the one or more benefits vendors.

The payment processing module 150 may communicate with the external banking system 190 and manage the virtual account within the external banking system 190 that receives the single deposit of funds. The payment processing module 150 may send one or more instructions to the external banking system 190 to separate the single deposit of funds in the virtual account into multiple payments and to transmit the multiple payments from the virtual account to the relevant recipients.

The foregoing payment processing operations may be combined as needed. The payment processing module 150 may remit payments to each and every vendor accurately and timely through an external banking system, including the United States federal banking system or any other financial transaction system.

Payments may also be made from benefits vendors 40 to clients in all the same ways disclosed herein.

The system 10 is configured to support all languages and all currencies, including without limitation multiple languages and multiple currencies simultaneously.

The system 10 may have various types of end-users, including without limitation companies, including insurance companies, brokers, carriers, third-party administrators, groups, captives, associations, employers, employees, and patients/insured alike.

The system 10 supports all billing types. Support for all payment requirements, including but not limited to self-bill, list bill with short pay, list bill without short pay, bill as deducted, and direct bill is provided by the system 10. The system 10 supports fully-insured, self-funded or any combination of insurance types across vendors and coverages of fully-insured, self-funded, and partially self-funded entities.

In circumstances of self-bill billing type, the bill processing unit 120 may be configured to calculate bill payments based on enrollment, plan and pricing information, and send enrollment data, adjustments, changes, the true-ups, and the payment information to the self-bill vendor along with a note to payee that accompanies the payment through the external banking system 190. This assists in allowing the vendor to automatically apply the self-bill payment to the correct account with the client's correct details once the payment is received. This also assists in negating a need for a client to go to the vendor's website, upload insured enrollment data, run calculations and/or fill out complex forms to determine a bill amount, and then send enrollment information and payment to the vendor.

In circumstances of list bill billing type with short pay, the bill processing unit 120 may be configured to calculate an accurate bill via the enrollment, plan and pricing data. Additional feeds, such as evidence of insurability, may be included in this calculation and reconciled against an invoice received from the vendor. The system 10 may identify all the exceptions that, once approved, are included with the enrollment data and such information may be electronically sent to the vendor along with the note to payee that accompanies the payment through the external banking system 190. This allows the vendor to automatically apply the self-payment to the correct account with the correct details once the payment is received.

Across all billing types, benefits vendors 40 may be notified immediately by the system 10, when there is a billing error. Benefits vendors 40 may receive a notification sent by one or more modules of the system 10, including the administration module 106, the reconciliation module 140, the vendor reporting module 160, or the CRM module 182. This allows clients to adhere to any contractual agreements to identify billing issues in a set period of time (e.g., 30 to 60 days) and prevent having the bill stand after the contractually agreed upon time period to object has expired. The system 10 thereby further stops overpayments to vendors.

In circumstances of list bill billing type without short pay, the bill processing unit 120 may be configured to follow the same processes concerning list bill billing type with short pay. In addition, the system 10 may be further configured to notify the vendor of exceptions and necessary corrections to be included in the next bill whilst sending the exact amount that was billed to the vendor with the appropriate note to payee as noted above.

In circumstances of direct bill billing type, insurance benefits recipients and/or employees may directly access the system 10 via a client electronic device 60. An insurance benefits recipient may directly access the system 10 to, for example, provide or update benefits information, including without limitation enrollment information, dependent information, or financial information, such as credit card information. The system 10 may be in direct contact with insurance benefits recipients and/or employees by, for example, automatically generating and sending letters to the insurance benefits recipients and/or employees regarding benefits information.

In addition to being configured to manage all the billing needs for a group captive or association, the system 10 may be utilized by third-party administrators (TPAs). The TPA, for instance, may receive data, including enrollment and pricing data, calculate invoices for clients, and deliver invoices electronically and/or via a paper invoice that is mailed by post to the client (both of which methods may be automated through the system 10). Additionally, the TPA may calculate and identify all exceptions and bill adjustments in the system 10 ensuring they are recorded when received from a client and applied properly and accurately to the next invoice that is sent out to that client. The system 10 is further configured provide TPAs the ability to generate a bill that is consolidated from all other vendors that a specific client is using providing the client a single consolidated bill that may be broken down by additional subsidiaries, departments, groups or locations.

The system 10 may be "white-labeled" by users. White label customization capabilities include full SSO integration to allow seamless insecure extension of existing user's web offerings, URL customization, SSI security certificate customization to a certificate owned and registered by the client, terms of use and privacy agreement customizations for client-specific requirements; all branding capabilities including but not limited to logo, font, icons, language, statements and/or bills, currency, page design, data displays (date format and time format), idle session timeout, password rules, data purging, email headers and footers generated via the system 10. Version history may be tracked.

The system 10 supports new plan periods that are calendar year or any other time during the year, and even cases when the different vendors/coverages have misaligned renewal dates. New clients may be onboarded at any time during the year and/or at or between annual renewal.

Through the consolidation, reconciliation and/or payment processes, the system 10 may comprise a data storage 162. The data storage 162 may record information produced, used, or generated by the other modules in the system, including without limitation the administration module 106, the trained neural networks 108 and 122, the rules engine 110, the processing unit 120, the consolidation module 130, the reconciliation module 140, the payment processing module 150, the vendor reporting module 160, the background module 152, the data analytics module 180, and the CRM module 182. The recorded information may be analyzed by one or more of the trained neural networks 108 and 122 and/or the data analytics module 180. The recorded information may allow brokers and clients to see data in a way that is actionable.

In the context of self-funded insureds, the system 10, including without limitation the administration module 106, may be configured to monitor fund reserve levels in real time, manage reserves and consolidated claims payments to the self-funded vendors. The system 10, including without limitation the administration module 106, the vendor reporting module 160, or the CRM module 182, may issue notifications and/or warnings to external recipients regarding reserve levels. The system 10, including without limitation the administration module 106, may forecast claims and issue forecasting reports related to reserve levels.

While the present teachings have been described above in terms of specific embodiments, it is to be understood that they are not limited to those disclosed embodiments. Many modifications and other embodiments will come to mind to those skilled in the art to which this pertains, and which are intended to be and are covered by this disclosure. For example, in some instances, one or more features disclosed in connection with one embodiment can be used alone or in combination with one or more features of one or more other embodiments.

It is intended that the scope of the present teachings should be determined by proper interpretation and construction of the disclosure and its legal equivalents, as understood by those of skill in the art relying upon the disclosure in this specification and the attached drawings.

What is claimed is:

1. A system for consolidating and reconciling invoices, comprising:
   an input port receiving benefits information related to insurance benefits recipients;
   a rules engine having a plurality of rules and enforcing said rules on the benefits information, said rules engine being configured to monitor the benefits information for determining exceptions based on the rules;
   said input port receiving a plurality of invoices from one or more benefits vendors provided to said recipients;
   a processing unit including a processor for executing a consolidation module and a reconciliation module;
   said reconciliation module analyzing and comparing each invoice against said benefits information to detect inaccuracies in each invoice, said inaccuracies being designated as exceptions;
   said consolidation module tracking said invoices and being configured to merge said invoices into a single bill, wherein during merging, said processing unit calculates an adjusted invoice amount for the invoice which has the exception and incorporates the adjusted invoice amount into the single bill;

an output port that transmits the single bill to a client device configured to make a single deposit of funds for settling said invoices from said one or more benefits vendors; and a payment processing module that communicates with an external banking system which has an account that received the single deposit of funds, said payment processing module sends one or more instructions to said external banking system to separate the single deposit of funds into multiple payments and to transmit the multiple payments to said one or more benefits vendors.

2. The system of claim 1, wherein the processing unit calculates an adjusted invoice amount by excluding a fee associated with the exception.

3. The system of claim 1, wherein said processing unit determines whether to include, exclude, or modify the invoice which has the exception based on a feedback signal from the client device.

4. The system of claim 1, wherein said processing unit includes a trained neural network which analyzes past feedback signals from the client device relating to previous actions taken with respect to exceptions, said trained neural network automatically instructs said processing unit as to how to calculate the adjusted invoice amount for the invoice that has the exception.

5. The system of claim 1, wherein said reconciliation module generates an exception report of the inaccuracies detected in said invoices and transmits said report to said client device.

6. The system of claim 1, wherein the payment processing module facilitates disbursement of money to said one or more carriers and/or vendors from said single deposit of funds.

7. The system of claim 1, further comprising an administration module that extracts discrete data elements from said benefits information and applies a tag to each data element.

8. The system of claim 7, wherein the tag comprises a timestamp of when the respective data element was imported into the system, a timestamp of when the respective data element is accessed or modified, and a username of a person who accessed or modified the respective data element.

9. The system of claim 7, wherein the tag is a timestamp, and wherein the administration module is configured to purge the data elements that have a particular timestamp based on a predetermined amount of time.

10. The system of claim 7, wherein said plurality of rules are stored in a rules database which is accessible by said rules engine, said rules include federal health insurance regulations, and wherein said administration module manages and updates said rules database by revising or removing outdated rules and adding new rules.

11. The system of claim 7, wherein said administration module includes a trained neural network that monitors actions performed by the reconciliation module and the consolidation module, said trained neural network generates a new rule based on said actions to be applied by said rules engine to said benefits information.

12. The system of claim 1, wherein the reconciliation module is configured to reconcile against multiple feeds of said benefits information to ensure accurate deductions and confirm evidence of insurability.

13. A system for consolidating and reconciling data, comprising:

an input port receiving a feed of data, said data comprising a plurality of statements generated by one or more sources external to said system, each statement having a plurality of data elements;

a rules engine having a plurality of rules and enforcing said rules on said data, said rules engine being configured to monitor said data and apply said rules thereto for determining exceptions;

a processing unit including a processor for executing a consolidation module and a reconciliation module;

said reconciliation module analyzing and comparing each data element of said respective statement against other data in said system to detect inequalities in each statement, said inequalities being designated as exceptions;

said consolidation module tracking said statements and being configured to merge said statements into a single consolidated statement, wherein during merging, said processing unit calculates an adjusted statement amount for the statement which has the exception and incorporates the adjusted statement amount into the single statement; and said processing unit being configured to transmit the consolidated statement to one or more client devices via an output port; and a payment processing module that facilitates disbursement of money from a single deposit of funds made via said client device to recipients which provided the plurality of statements;

wherein said payment processing module communicates with an external banking system and manages a virtual account within the external banking system that received the single deposit of funds, said payment processing module sends one or more instructions to said banking system to separate the single deposit of funds in the virtual account into multiple payments and to transmit the multiple payments from the virtual account to the recipients.

14. The system of claim 13, further comprising an administration module that extracts the data elements from each of said plurality of statements and applies a tag to each data element.

15. The system of claim 14, wherein the tag comprises a timestamp of when the respective data element was imported into the system, a timestamp of when the respective data element is accessed or modified, and a username of a person who accessed or modified the respective data element.

16. The system of claim 15, wherein the administration module limits which data elements are accessed by a particular username according to a security level associated with the particular username.

17. The system of claim 16, wherein the administration module tracks which data elements are accessed by the particular username and tracks which data elements the particular username attempted to access and/or modify.

18. A system for consolidating and reconciling invoices, comprising:

an input port receiving benefits information related to insurance benefits recipients;

a rules engine having a plurality of rules and enforcing said rules on the benefits information, said rules engine being configured to monitor the benefits information for determining exceptions based on the rules;

said input port receiving a plurality of invoices concerning one or more benefits vendors provided to said recipients;

a processing unit including a processor for executing a consolidation module and a reconciliation module;

said consolidation module standardizing said plurality of invoices and merging said invoices into a single statement;

said reconciliation module analyzing and comparing said single statement against said benefits information to detect inequalities, said inequalities being designated as exceptions, said reconciliation module generating a reconciled single statement comprising data elements from said plurality of invoices that do not result in exceptions;

an output port that transmits the reconciled single statement to a client device configured to make a single deposit of funds for settling said invoices concerning said one or more benefits vendors; and a payment processing module that communicates with an external banking system which has an account that received the single deposit of funds, said payment processing module sends one or more instructions to said external banking system to separate the single deposit of funds into multiple payments and to transmit the multiple payments to said one or more benefits vendors.

* * * * *